United States Patent
Holland et al.

(10) Patent No.: US 6,507,867 B1
(45) Date of Patent: Jan. 14, 2003

(54) CONSTRUCTING, DOWNLOADING, AND ACCESSING PAGE BUNDLES ON A PORTABLE CLIENT HAVING INTERMITTENT NETWORK CONNECTIVITY

(75) Inventors: Ian Michael Holland, Austin, TX (US); David L. Kaminsky, Chapel Hill, NC (US); Christina Lau, Scarborough (CA); Sandeep K. Singhal, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/218,947

(22) Filed: Dec. 22, 1998

(51) Int. Cl.[7] ............................................... G06F 15/16
(52) U.S. Cl. ..................................................... 709/219
(58) Field of Search ................................. 709/219, 203

(56) References Cited

U.S. PATENT DOCUMENTS

| | | | | |
|---|---|---|---|---|
| 5,727,159 A | | 3/1998 | Kikinis ........................ | 709/246 |
| 5,737,599 A | | 4/1998 | Rowe et al. ................ | 707/104 |
| 5,768,510 A | | 6/1998 | Gish ........................... | 709/203 |
| 5,862,325 A | * | 1/1999 | Reed et al. .................. | 709/201 |
| 6,094,659 A | * | 7/2000 | Bhatia ........................ | 707/104 |
| 6,163,779 A | * | 12/2000 | Mantha et al. .............. | 707/100 |
| 6,189,029 B1 | * | 2/2001 | Fuerst ........................ | 709/217 |

OTHER PUBLICATIONS

Dynamic Loading of Locale Specific Hyper Text Markup Language (HTML) Pages. IBM Research Disclosure Bulletin. Mar. 10, 1998. p. 1.

* cited by examiner

Primary Examiner—David Y. Eng
(74) Attorney, Agent, or Firm—A. Bruce Clay; Marcia L. Doubet

(57) ABSTRACT

A method, system, and computer-readable code for a technique by which multiple Web pages can be dynamically bundled (i.e. packaged) and downloaded for accessing on a user's workstation, enabling the user to perform a meaningful interaction even in the absence of an ongoing network connection. The proposed technique uses an on-demand bundling approach, ensuring that a requesting user will receive the most recent versions of any bundled files. The proposed technique often serves to reduce the number and duration of network connections required, enabling a user to work productively while offline. Further, the bundle may optionally contain executable code such as one or more servlets, which will execute on the user's workstation to enable dynamic content generation. Messages may be created and queued during processing of the downloaded bundle, for sending to a server when the user subsequently establishes a network connection. Optionally, data mining software may be used advantageously with this technique, to increase the likelihood of constructing a bundle that will meet the user's needs throughout the offline interaction. Additionally, transcoding may optionally be performed on a bundle destined for a particular user, that will tailor the bundled software to the user's current working environment.

47 Claims, 9 Drawing Sheets

FIG. 6B page1.html 457 (contents of page1.html)
page2.html 341 (contents of page2.html)
page3.html 5423 (contents of page3.html)
page4.html 98 (contents of page4.html)

(where 457, 341, 5423 and 98 are the number of bytes in page1.html, page2.html, page3.html and page4.html, respectively)

CONSTRUCTING, DOWNLOADING, AND ACCESSING PAGE BUNDLES ON A PORTABLE CLIENT HAVING INTERMITTENT NETWORK CONNECTIVITY

BACKGROUND OF THE INVENTION

1. Field of the Invention

The present invention relates to a computer system, and deals more particularly with a method, system, and computer-readable code for dynamicall constructing page bundles on demand at a server, and downloading the bundles to a requesting client that may be portable and may have intermittent network connectivity. The bundles may then be accessed at the client, without requiring an on-going networke connection. A bundle may included one or more part a servlets, enabling dynamic content generation at the client.

2. Description of the Related Art

It is commonplace today for computer users to connect their machines to other computers, known as "servers," through a network. The network may be a private network, such as a corporate intranet of networked computers that is accessible only to computer users within that corporation, or it may a public network, such as the Internet or World-Wide Web. The Internet is a vast collection of computing resources, interconnected as a network, from sites around the world. The World-Wide Web (referred to herein as the "Web") is that portion of the Internet which uses the HyperText Transfer Protocol ("HTTP") as a protocol for exchanging messages. (Alternatively, other protocols such as the "HTTPS" protocol can be used, where this protocol is a security-enhanced version of HTTP.)

The user may connect his computer to a server using a "wireline" connection or a "wireless" connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a Local Area Network (LAN) card such as Token Ring or Ethernet; using a cellular modem to establish a wireless connection; etc. The user's computer may be any type of computer processor, including laptop, handheld or mobile computers; vehicle-mounted devices; cellular telephones and desktop screen phones; peripheral (e.g. printer, fax machine, etc.); desktop computers; mainframe computers; etc., having processing and communication capabilities. The remote server, similarly, can be one of any number of different types of computer which have processing and communication capabilities. These techniques are well known in the art, and the hardware devices and software which enable their use are readily available Hereinafter, the user's computer will be referred to as a "workstation," and use of the terms "workstation" or "server" refers to any of the types of computing devices described above.

A user of the Internet typically accesses and uses the Internet by establishing a network connection through the services of an Internet Service Provider (ISP). An ISP provides computer users the ability to dial a telephone number using their workstation modem (or other connection facility, such as satellite transmission), thereby establishing a connection to a remote computer owned or managed by the ISP. This remote computer then makes services available to the user's computer, hence such computers are often referred to as "servers." Typical services include: providing a search facility to search throughout the interconnected computers of the Internet for items of interest to the user; a browse capability for displaying information located with the search facility; and an electronic mail facility, with which the user can send and receive mail messages to and from other computer users. Similar facilities are typically available when the user connects to a server in an intranet or an extranet (that is, a network owned or managed by another company and which provides services in a similar manner to the Internet or an intranet).

The user working in a networked environment will have software running on his workstation to allow him to create and send requests for information to a server and to see the results. When the user connects to the Web, these functions are typically combined in software that is referred to as a "Web browser," or "browser." After the user has created his request using the browser, the request message is sent out into the Internet for processing. The target of the request message is one of the interconnected servers in the Internet network. That server will receive the message, attempt to find the data satisfying the user's request, format that data for display with the user's browser, and return the formatted response to the browser software running on the user's workstation. The response is typically in the form of a display, referred to as a "Web page," that may contain text, graphics, images, sound, video, etc. The user will also typically have an electronic mail ("e-mail") software package installed on his workstation, which enables him to send and receive e-mail to and from the workstation of other computer users. Additionally, the user may have software on his workstation that supports sending requests to, and receiving responses from, automated file delivery services. For example, the File Transfer Protocol ("FTP") may be used to retrieve a file stored in a remote location to the user's workstation.

These are examples of a client-server model of computing, where the machine at which the user requests information is referred to as the client, and the computer that locates the information and returns it to the client is the server. In the Web environment, the server is referred to as a "Web server." The client-server model may be extended to what is referred to as a "three-tier architecture." This architecture places the Web server in the middle tier, where the added tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create and format the data to be returned. In this architecture, the Web server augmented by the component performing this processing may be referred to as an "application server."

As more people connect their workstations to the Web, the number of messages and files being sent is skyrocketing. (Hereinafter, the terms "message" and "file" are used interchangeably when referring to data being sent through a network, unless otherwise stated.) Coupled with this increase in the number of network users and files is an increase in the size of the files commonly being sent. For example, a short e-mail message with a relatively simple graphic image attached may be on the order of several hundred thousand bytes of data. Users may send and receive many such files over the course of a day's work or in their personal network communications.

A great deal of user frustration can result when trying to access popular Web sites which must service an everincreasing number of user requests, and which often have slow response times due to this heavy request load. Additionally, long delays may result when users request delivery of large files to their workstation (or even when requesting relatively small files from congested servers), creating yet more user frustration. The popularity of using portable computers such as handheld devices for connecting to the Internet, or other networks of computers, is increasing as user interest in computing becomes pervasive and users are more c often working in mobile environments. At the same time, the popularity of making network connections using connection services that charge fees based upon the duration of connections (such as cellular services, which are commonly used for wireless connections from portable computers) is also growing. When using this type of relatively expensive connection, the longer the user must wait to receive a file, the higher his connection charges will be. Wireless connections also tend to have high network latencies, due to the limited bandwidth available and the extra network hops (e.g. gateways) that are involved with wireless transmission. As a result, a user may have to wait a relatively long time to receive a response to a request he has sent into the network. These are some of the factors behind an increasing tendency of Web users to work offline with Web pages, whereby the user selects pages for downloading to his workstation from a Web server and then uses a browser to view this local copy of the pages after having disconnected from the network.

When a user is interacting with the Internet, the browser running on the user's workstation typically accepts the data it will display in response to the user's request as a data stream formatted using the HyperText Markup Language ("HTML"). HTML is a standardized notation for displaying text and graphics on a computer display screen, as well as for providing more complex information presentation such as animated video, sound, etc. When browsers expect an incoming response to be formatted using HTML, servers generate their response in that format. The browser processes the HTML syntax upon receipt of the file sent by the server (or from parsing a local copy of the file, when working offline), and renders a Web page according to the instructions specified by the HTML commands. Browsers are also commercially available for notations other than HTML that are used for specifying Web content. Common examples of these other notations are the Extensible Markup Language ("XML"), and pages represented in other standard formats such as the Wireless Markup Language ("WML").

Web pages were originally created to have only static content. That is, a user requested a specific page, and the predefined contents of that page were located by a Web server and returned for formatting and display at the user's computer. To change the page content or layout, the HTML syntax (or other notation) specifying the page had to be edited. However, the Web is moving toward dynamic page content, whereby the information to be displayed to the user for a given page can be generated dynamically when each request is received at the server.

With dynamically-generated content, a request for the Web page stored at a given Uniform Resource Identifier ("URI") or Uniform Resource Locator ("URL") may result in a wide variety of page content being returned to the user. (References to "URL" hereinafter are intended to include URIs unless stated otherwise.) One common, simple use of dynamic page content is the "visitor counts" which are often displayed on Web pages, with text such as "You are the 123rd visitor to this site since Jan. 1, 1997" (where the count of visitors is accumulated at the server and inserted into the HTML syntax before returning the page to the user). Other simple uses include displaying the current date and time on the page. More advanced techniques for dynamic content allow servers to provide Web pages that are tailored to the user's identification and other available information about the user. For example, servers providing travel reservation services commonly store information about the travel preferences of each of their users and then use this information when responding to inquiries from a particular user. Dynamic content may also be based upon user classes or categories, where one category of users will see one version of a Web page and where users in another category will see a different version—even though all users provided the same URL to request the Web page from the same server. For example, some Web server sites provide different services to users who have registered in some manner (such as filling out an on-line questionnaire) or users who have a membership of some type (which may involve paying a fee in order to get enhanced services, or more detailed information). The difference in dynamic content may be as simple as including the user's name in the page, as a personalized electronic greeting, or the dynamic content may be related to the user's past activities at this site. On-line shopping sites, for example, may include a recognition for repeat shoppers, such as thanking them for their previous order placed on some specific day or offering a special limited-availability discount.

A number of techniques for providing dynamic page content exist. One such technique is use of an Active Server Page ("ASP") on a Microsoft Web server, which detects a specific command syntax in an HTML page and processes the embedded commands before returning the page to the user. Another technique is the use of servlets, which are executable code objects that can be dynamically invoked by the Web server to process a user request. Servlets typically perform some specialized function, such as creating page content based on dynamic factors. Or, Dynamic Server Pages ("DSPs") or Java Server Pages ("JSPs") may be used to create dynamic content using compiled Java on Java-aware Web servers. ("Java" is a trademark of Sun Microsystems, Inc.) CGI ("Common Gateway Interface") scripts and applications may also be used as sources of dynamic content.

Software programs known as "data mining" applications deduce patterns and/or relationships from data stores such as databases using statistical analysis techniques. One common usage of data mining is to track user behavior patterns when accessing a Web server. By monitoring sequences of requests, the software may deduce a user's request patterns over time and may also infer a user's future behavior using these deduced patterns. As a simple example, suppose a user requests to view an on-line television schedule from a server which begins by requesting the user's zip code, and then offers a selection of (1) broadcast and cable providers in that zip code, and (2) viewing time periods within the day. If the user always requests the same zip code, the same cable provider, and the evening prime-time viewing hours, a data mining application may detect this pattern and establish it as an automatic default for this user. By monitoring request patterns in this way, the server applications can provide customized treatment for repeat viewers, eliminating the annoyance that results when the user has to repeatedly enter the same data upon each visit, while still allowing new and repeat visitors the full flexibility of options from which to select. More complex patterns can also be detected by data mining, including which page(s) a particular user is likely to request during a specific type of interaction; the page sequence most often followed by new users at a particular site; whether a different page sequence is preferred by users who have accessed the site more than some ascertainable number of times (skipping introductory material, for example); etc. As electronic commerce becomes more prevalent on the Web, and electronic businesses become increasingly competitive, tracking user behavior patterns in this manner will be increasingly valuable and commonplace. Examples of data mining software products that are commercially available include "SurfAid" and "Intelligent Miner" from IBM. Refer to the Web site "netmining.dfw.ibm.com" for more information about SurfAid, and "www.software.ibm.com./data/iminer" for more information about Intelligent Miner, or contact your local IBM branch office. ("Intelligent Miner" is a trademark of IBM.)

In the presence of these factors, computer users need a way to work offline efficiently, viewing and interacting with Web pages without the expense and processing delays that occur with a network connection, while still being able to perform productive work. Users often have no way of knowing which pages they need for their offline work, especially when one page may provide links to many other pages, and thus may find it difficult to determine which pages should be downloaded if they wish to work in this mode. If one or more pages is needed during the offline interaction that was not downloaded during the connection, the user will find that he cannot complete his intended work without making another network connection to retrieve missing pages. More than one additional network connection may be required, if the user still fails to correctly predict the pages he needs in a subsequent download operation. As the level of "computer savvy" of the average Internet user decreases with the expansion of Internet usage into the general public, an average user is decreasingly likely to be able to accurately pre-select a complete subset of Web pages for offline viewing.

Accordingly, a need exists for a technique by which multiple Web pages can be dynamically bundled (i.e. packaged) and downloaded for accessing on a user's workstation, enabling the user to perform a meaningful interaction even in the absence of an ongoing network connection. The proposed technique uses an on-demand bundling approach, ensuring that a requesting user will receive the most recent versions of any bundled files. The proposed technique often serves to reduce the number and duration of network connections required, enabling a user to work productively while offline. Further, the bundle may optionally contain executable code such as one or more servlets, which will execute on the user's workstation to enable-dynamic content generation. Messages may be created and queued during processing of the downloaded bundle, for sending to a server when the user subsequently establishes a network connection. Optionally, data mining software may be used advantageously with this technique, to increase the likelihood of constructing a bundle that will meet the user's needs throughout the offline interaction. Additionally, transcoding may optionally be performed on a bundle destined for a particular user to tailor the bundled software to the user's current working environment.

SUMMARY OF THE INVENTION

An object of the present invention is to provide a technique with which multiple Web pages can be dynamically bundled and downloaded for accessing on a user's workstation, enabling the user to perform a meaningful interaction even in the absence of an ongoing network connection.

Another object of the present invention is to provide a technique whereby this bundling occurs on demand, ensuring that a requesting user will receive the most recent versions of any bundled files.

It is a further object of the present invention to provide a technique whereby the number and duration of network connections required is reduced, enabling a user to work productively while offline.

It is another object of the present invention to provide a technique whereby the bundle may contain executable code such as one or more servlets, which will execute on the user's workstation to enable dynamic content generation.

It is a yet another object of the present invention to provide a technique whereby messages may be created and queued during processing of the downloaded bundle, for sending to a server when the user subsequently establishes a network connection.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented technique for use in a computing environment capable of having a connection to a network for enabling offline Web page processing, comprising: receiving a request for a Web page bundle at a server in the network; dynamically constructing the Web page bundle; and downloading the dynamically constructed Web page bundle. Preferably, the dynamically constructing further comprises: accessing a repository wherein a plurality of bundle descriptors are stored; determining if one of the bundle descriptors matches the request; using the matching bundle descriptor to locate and retrieve one or more stored files referenced therein when the determining has a positive outcome; locating and retrieving a single file specified by the request when the determining has a negative outcome; and formatting the located and retrieved files into the dynamically constructed bundle. Using the matching bundle descriptor preferably further comprises locating and retrieving at least one servlet capable of creating dynamic content. A content-reducing transformation may optionally be applied to one or more of the located and retrieved files prior to the formatting. The dynamically constructing may further comprise using results of a data mining operation, and/or locating and using embedded page references.

The present invention also provides a software-implemented technique for intercepting a user request for a page, the intercepting operating on a client in the network; determining if the page is stored locally; retrieving the requested page from a local storage when the determining has a positive outcome; sending a page bundle request to a server in the network when the determining has a negative outcome; receiving the requested page bundle; storing the received page bundle; and delivering the requested page to the user. Optionally, delivering the requested page may further comprise locating and executing at least one servlet capable of creating dynamic content.

The present invention will now be described with reference to the following drawings, in which like reference numbers denote the same element throughout.

BRIEF DESCRIPTION OF THE DRAWINGS

FIGS. 6A–6B depict examples of the syntax that may be used to create bundles.

DESCRIPTION OF THE PREFERRED EMBODIMENT

Figure 1:
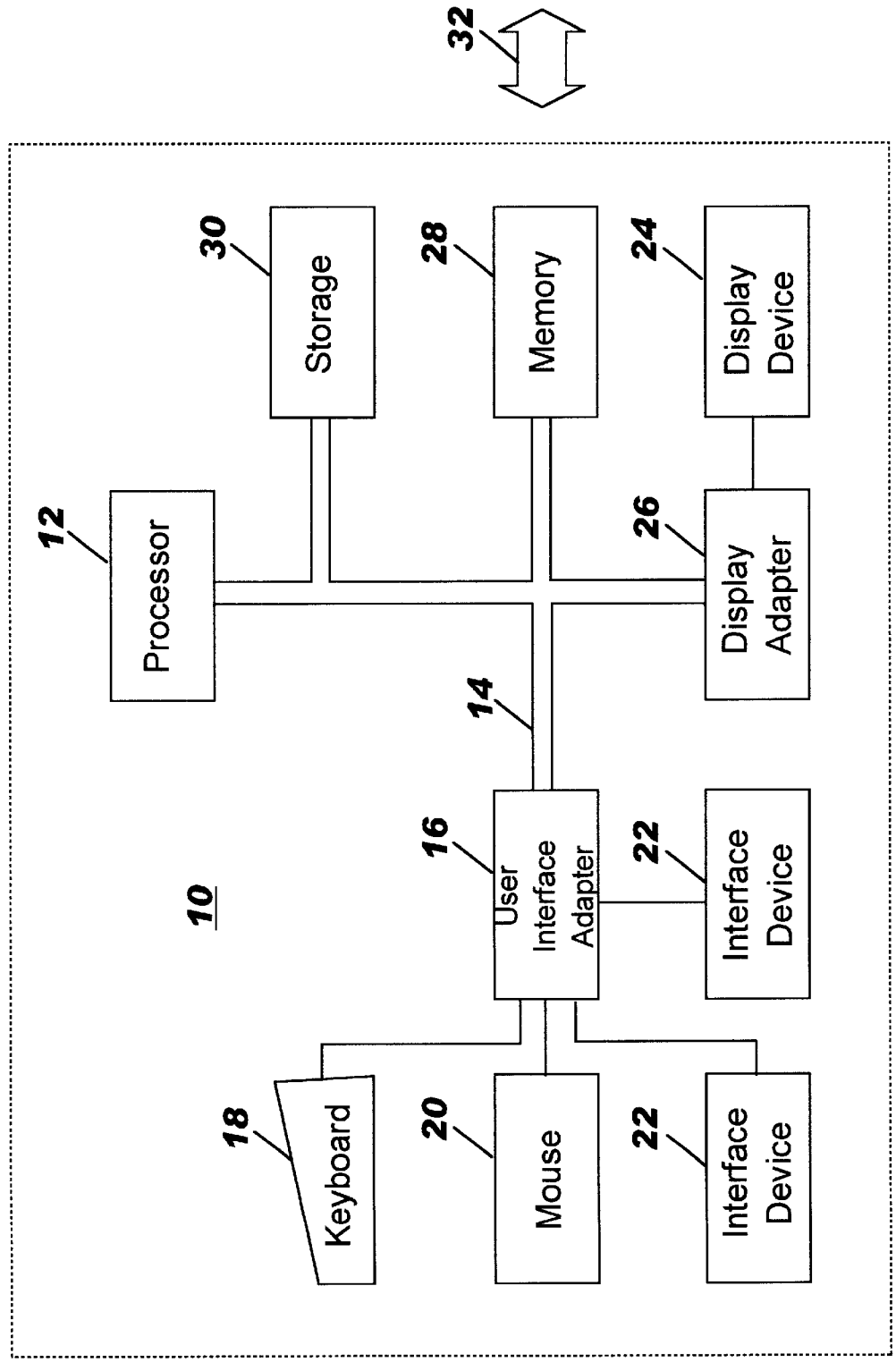
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
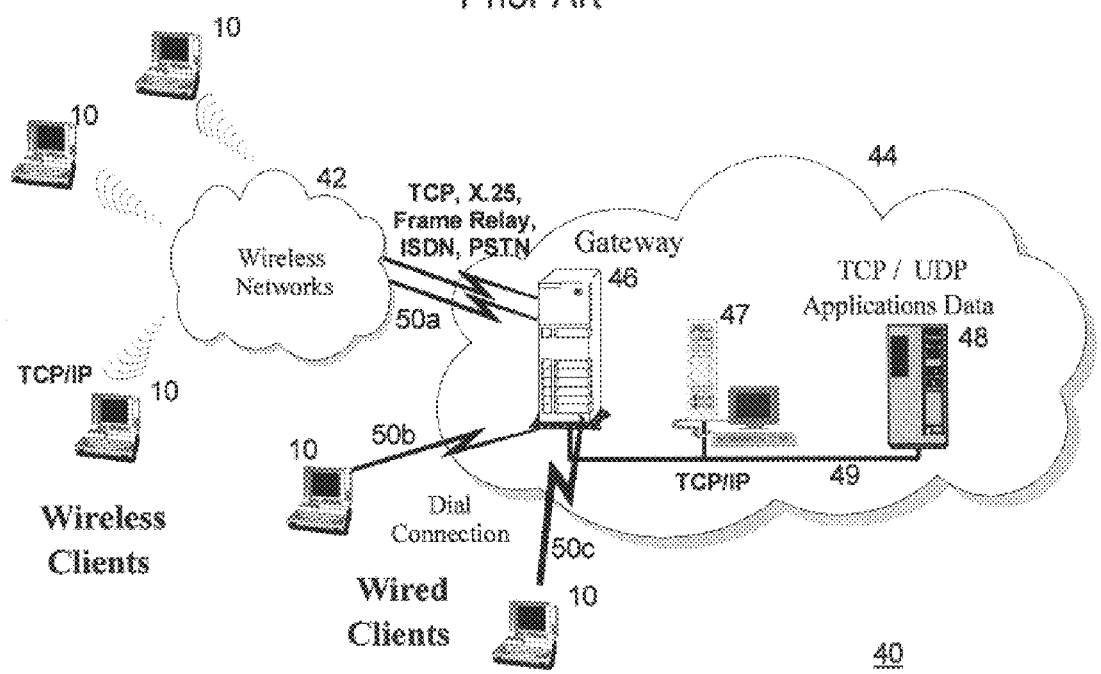
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and (wired) network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from the International Business Machines Corporation ("IBM"), or an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The preferred embodiment of the present invention will now be discussed with reference to FIGS. 3 through 7.

In the preferred embodiment, the present invention is implemented as computer software programs. These programs will be used where (1) a user interacts with a browser and requests one or more Web pages for accessing by that browser, and (2) software application(s) running on a server respond to the user's request for Web pages, and return data to the user's browser in response. The implementation of the logic that will execute on the client workstation is preferably one or more modules (also referred to as code subroutines, or "objects" in object oriented programming) which are invoked in response to requests from a standard, commercially-available browser. Alternatively, the logic could be incorporated into a specially designed browser. The implementation of the logic for the bundling process that will execute on the server may be integrated with the code of the server application, as one or more modules which are invoked during execution of the server application. Preferably, however, the logic will be implemented as a separate program, for example as a servlet, which provides services that are accessed by the server application. The server side of the implementation may execute on a computer functioning as a Web server, where that Web server provides services in response to requests from a client using a Web browser connected to the Internet. Alternatively, the ax connection may be to a corporate intranet or extranet of which the user's workstation is a component. Use of the term "Internet" herein, when discussing processing associated with the user's request, includes processing that occurs in an intranet or extranet, unless otherwise stated. In a Web environment, client requests will typically be sent to the host server using HTTP. However, because the present invention operates independently of the mechanism used to fetch the data, other protocols such as FTP, Gopher, proprietary protocols, etc., may also be used without deviating from the inventive concepts defined herein.

Figure 3:
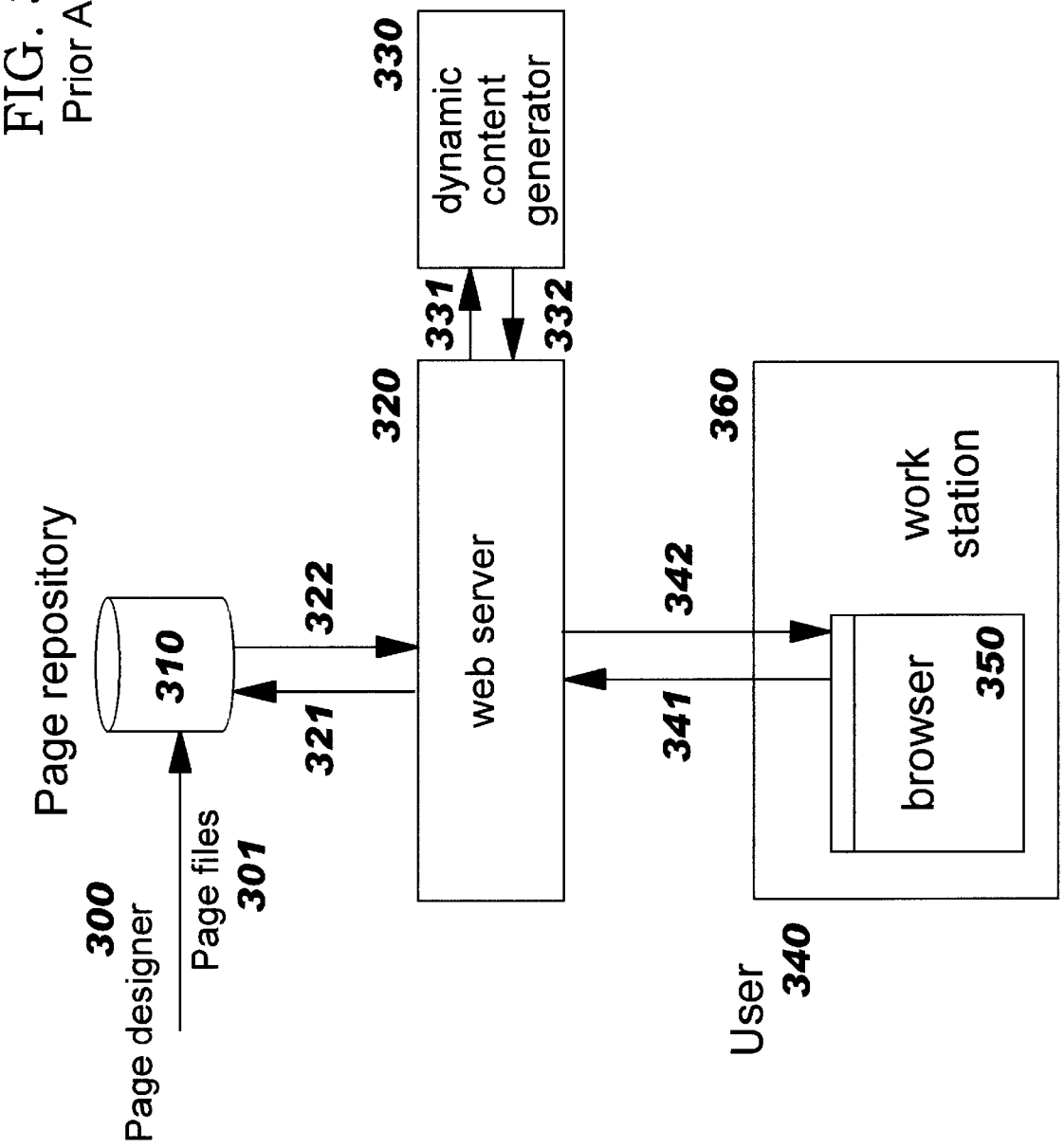
FIG. 3 illustrates a path taken by a request that is sent from a client's browser to a Web server, and the path of the response, using techniques of the prior art.

FIG. 3 illustrates a path taken by a request that is sent from a client's browser to a Web server and the path of the response, using techniques of the prior art. Web page designers 300 create the content of one or more Web pages and store 301 the files for those pages (including the content linked into each page, such as referenced image and sound files) in a Web page repository 310, which may be simply a database or disk file system. (Note that while FIG. 3 shows a single repository 310, this is for ease of illustration. More than one repository may be used equivalently.) When a user 340 makes a request 341 from the Web browser 350 executing on his workstation 360, the request 341 flows across a network connection to a Web server 320. The Web server 320 retrieves 321, 322 the requested page from the page repository 310, and returns it 342 to the requesting browser 350. Alternatively, the request 341, upon arriving at the Web server 320 is directed 331 to a dynamic content generation module 330 that dynamically constructs the requested Web page content and returns it 332, 342 to the requesting browser 350. In either case, typically, browser 350 will display the page to the user and may optionally store a copy in a cache or disk file. By storing a copy of the page locally, a subsequent user request to view the same page can often be met by retrieving and redisplaying the local copy, rather than requesting the page over a network connection from the server again and awaiting its redelivery. These techniques are well known in the art.

Figure 4A:
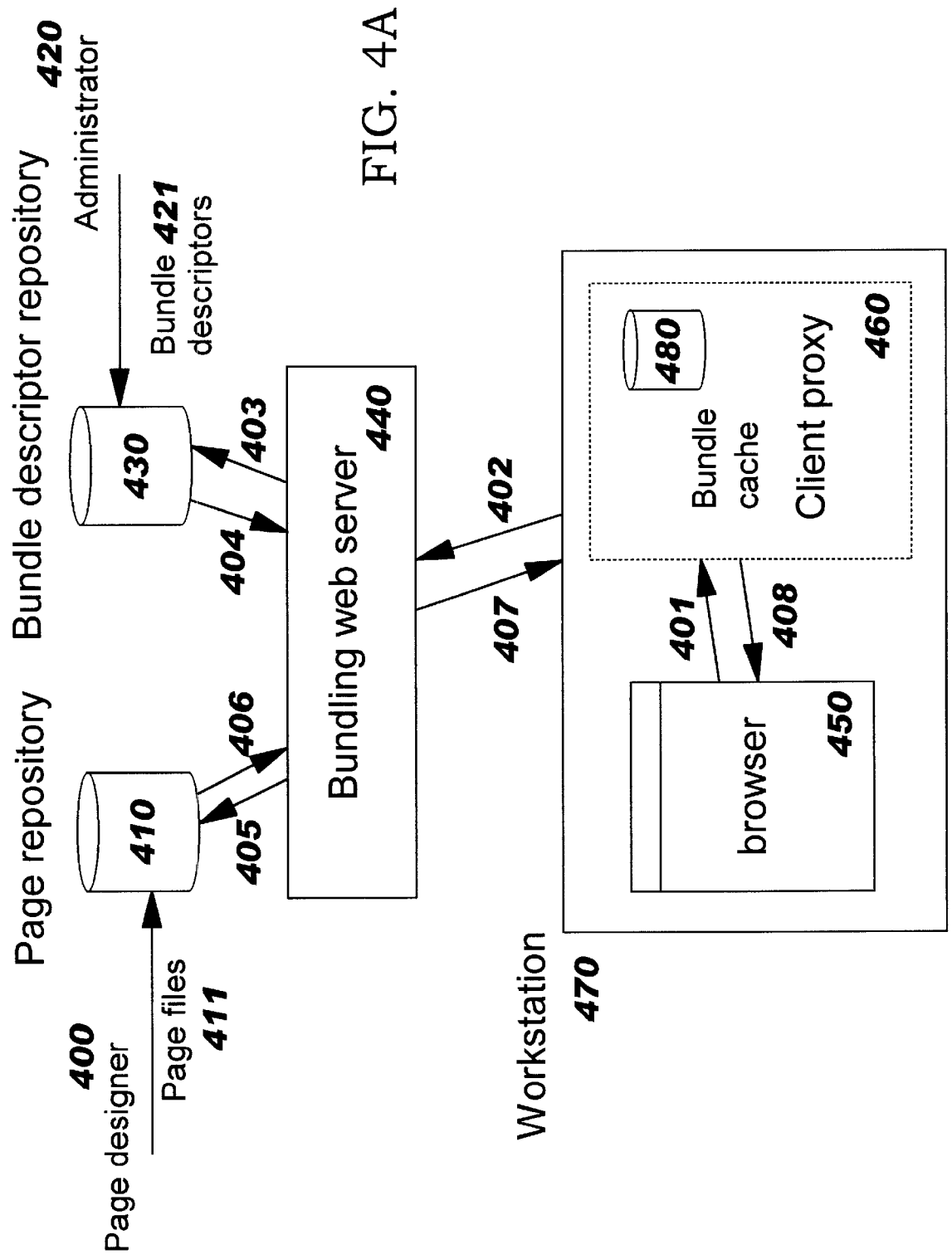
FIGS. 4A–4B illustrate the architecture of the preferred embodiment of the present invention, showing how the various components interact.
Figure 4B:
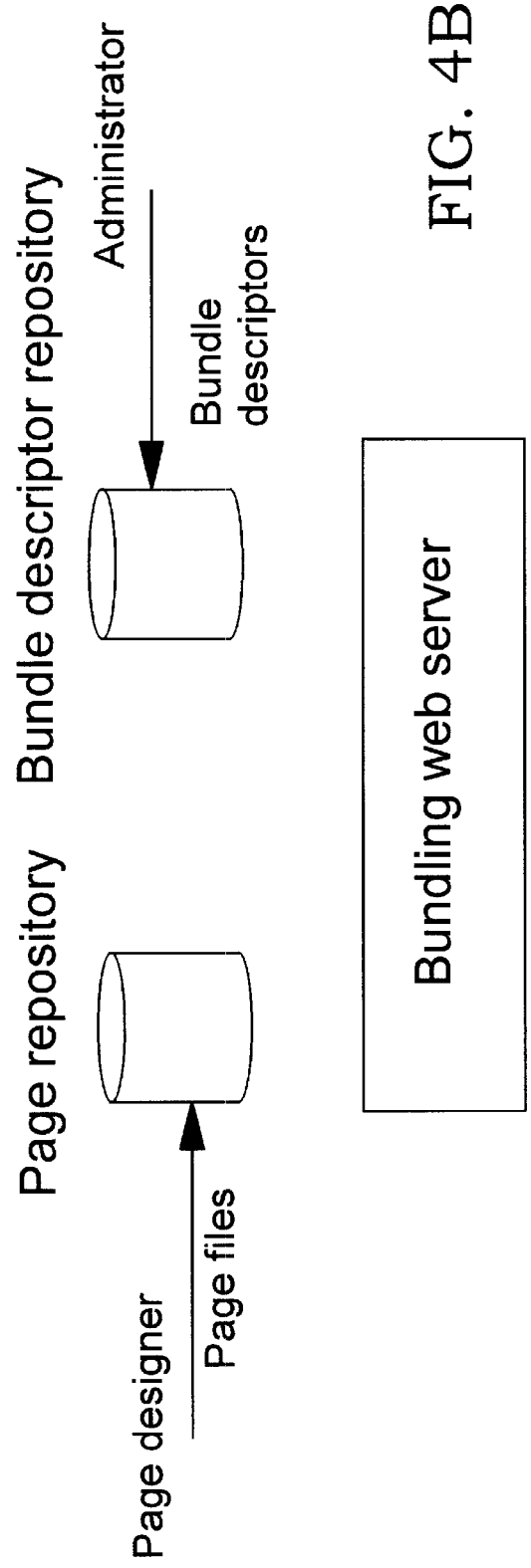
Figure 4B:
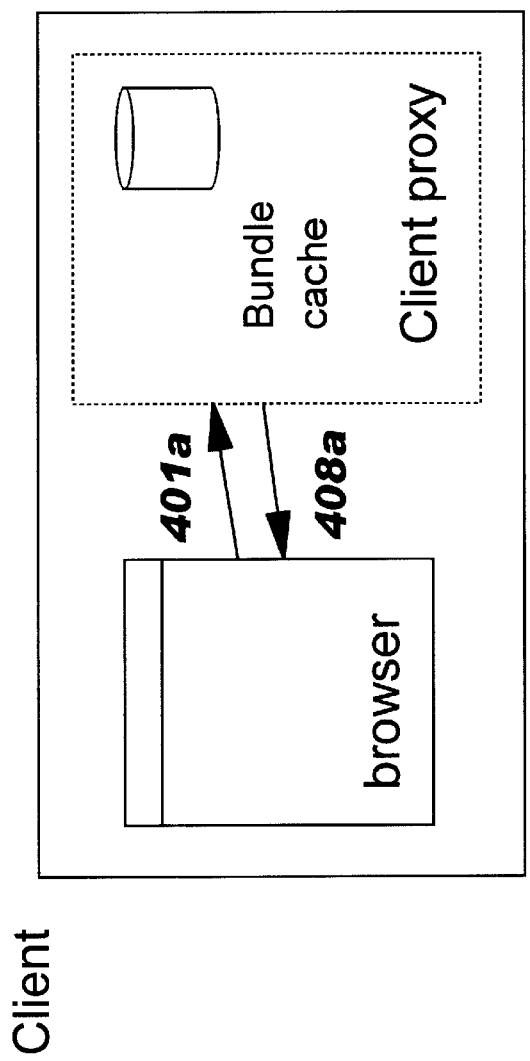

FIGS. 4A–4B illustrate the architecture of the preferred embodiment of the present invention, showing how the various components interact. A "bundle," as used herein, refers to a file or object comprised of one or more other files or objects, which will be transmitted to the requester as a single unit. FIG. 4A shows the page bundling and downloading process that occurs in response to a user's request, and FIG. 4B shows how the pages are accessed locally, after the bundle has been downloaded. Web page designers 400 create page content and store the files for the pages 411 (again, including the linked content for the pages) in one or more page repositories 410, using the same prior art process described with reference to FIG. 3.

Figure 5:
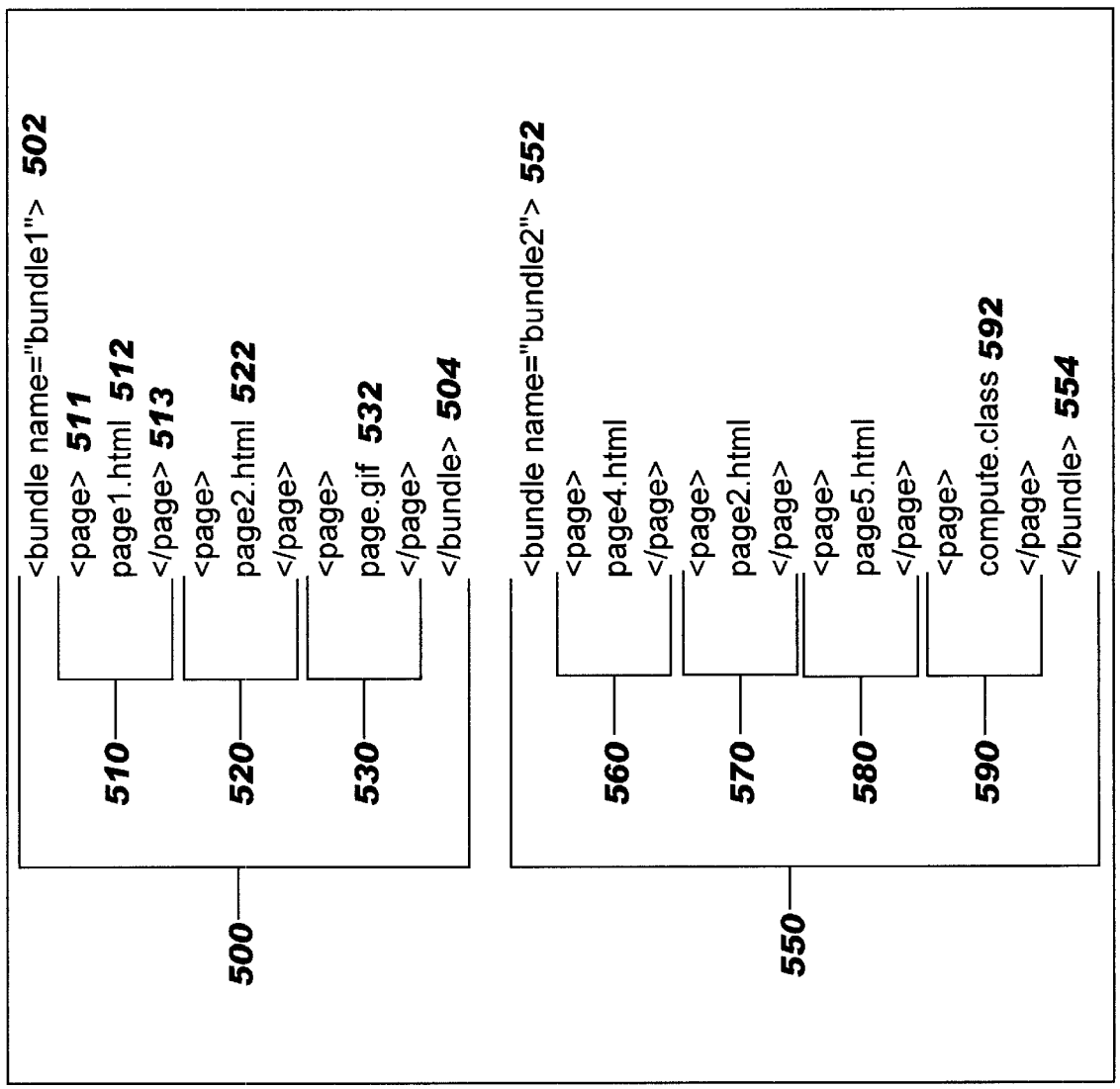
FIG. 5 illustrates an example of the syntax with which bundle descriptors may be specified.

In one embodiment of the present invention, a person, such as a systems administrator 420, creates a bundle descriptor that defines which pages should be "bundled" (i.e. packaged together) and delivered as a unit when that bundle is requested or when any page in that bundle is requested. This descriptor is then stored 421 in a bundle descriptor repository 430. The specific syntax with which this bundle descriptor is created does not form part of the present invention. Preferably, the bundle descriptor is expressed in the Extensible Markup Language ("XML") as a simple list of page references, as shown in FIG. 5. Typically, the files that are specified as being in a particular bundle will comprise some logical unit of interaction that the systems administrator expects to occur between a user, working at his browser interface, and a Web server. The bundle descriptor will typically specify not only the pages that the user will view, but also any files that are linked to those pages (such as image files that may be used when constructing a viewable page). For example, if the user is interacting with a multi-page form (e.g. to register for an on-line service), then all pages in that multi-page form and all files linked to those pages might be specified in the bundle. Further, according to a novel feature of the present invention, a bundle descriptor may contain a reference to executable code such as a servlet that may be invoked during the user's interaction. As further discussed below, bundling the pages of a logical interaction in this manner will reduce the number and/or length of network connections required for the user to perform a given task.

In an alternative embodiment, a data mining software application (not shown in FIG. 4A) may be used in the process of creating the page bundle descriptors. This data mining software analyzes data for patterns and relationships, making deductions and inferences as previously described. Preferably, this type of data mining software will be used to supplement predefined bundle descriptors 421 created by the human user, but the descriptors may also be created entirely using the data miner. The data miner may be invoked by the bundling Web server 440 dynamically upon receipt of a user request for a Web page, or it may be invoked periodically (e.g. using a calendar-driven invocation, or upon explicit request from a systems administrator) to mine the available data and update (or create) bundle descriptors as indicated by this review (i.e. mining) of the data. When the data miner is invoked periodically, it will store the updated or created page bundle descriptors in the repository 430. When it is used in response to a Web page request, it may store the page bundle descriptor in the repository 430, or it may simply return the descriptor that results from its processing to the bundling Web server 440 as if the descriptor had come from the repository. This latter approach results in each bundle request being generated dynamically, taking advantage of the most up-to-date information available from the mining process.

In yet another embodiment of the present invention, a software routine (not shown in FIG. 4A) may be used that will "walk the Web site" during the bundling process. This "walk the Web site" routine, which is typically referred to as a Web Crawler, comprises determining all embedded page and file references for the requested Web page and is performed by processing the HTML syntax (or other page markup notation) and searching it for embedded URLs. Each referenced page may also be processed in this manner, to locate its embedded URLs. The technique with which page syntax can be parsed looking for URLs in this manner will be obvious to one of ordinary skill in the art. The located URLs will then be added, as necessary, to the page bundle descriptor. Optionally, a maximum bundle size may be specified (for example, as a configuration parameter). When the bundle being generated reaches this size, the process of locating and including referenced pages will end. (This may be useful, for example, to limit the size of the bundle file that must be downloaded over a slow connection or to a limited storage client workstation, etc.) This walk-the-Web software routine may be used to create page descriptors either dynamically upon user request or in a scheduled manner (as described for the data miner); it may also access predefined page bundle descriptors 421 (as described above) and augment their content; and it may be combined with data mining software.

Returning now to FIG. 4A, a user at a client workstation 470 is interacting with his Web browser 450. When the user makes a request for a Web page, instead of the request being transmitted to a Web server as in the prior art, according to the present invention this request 401 will be intercepted by an embedded client-side server. In the preferred embodiment, this embedded server is a limited-function, optimized version of a Web server, which performs the functions of (1) receiving page requests from a browser; (2) determining if the request can be processed locally; and (3a) routing the request for local processing, or (3b) sending the request to the network, depending on the outcome of (2). Because this server functions on behalf of the client workstation 470, it will be referred to hereinafter as a "client proxy server," or simply "client proxy" 460. The code implementing this client proxy must be installed on the client device in advance of using the present invention and operates according to the logic depicted in FIG. 7 (described below). When the client proxy 460 determines that the requested Web page 401 is already available locally, the process flow shown in FIG. 4B is used; otherwise, a page bundle request 402 is sent to a bundling Web server 440 as shown in FIG. 4A.

The operation of the bundling server 440 depends on which of the above-described embodiments is being used for creating page bundle descriptors. If descriptors 421 are being stored statically (i.e. after being predefined) in a repository 430, then the bundling server 440 will access 403 the repository to determine if a bundle exists for the page requested in request 402. If so, then the bundling Web server 440 will use the located bundle descriptor 404 to construct the page bundle on demand by retrieving 405, 406 the pages and other files identified in the bundle descriptor, and packaging them together into a bundle. Once constructed, the bundle will be returned 407 to the requesting client proxy 460. When there is no statically stored bundle descriptor for the requested Web page, and bundle descriptors are not being dynamically created using data mining or walk-the-Web-site techniques, then the single Web page from the request 402 will be retrieved, using its URL, and returned 407 to the client proxy 480. However, if either (or both) of the data miner or walk-the-Web-site approaches are being used to determine bundle contents in a dynamic manner, then absence of a page bundle descriptor can be detected in the bundling Web server 440 and used to signal these components to generate a bundle descriptor dynamically. These components may also be used to augment the bundle descriptor retrieved at 404 by searching for additional pages that should be added dynamically to the predefined bundle content. The bundle descriptor that results from using these components is used to retrieve each identified page or file. The bundling Web server 440 then packages the files into a bundle, and returns 407 the bundle to the client proxy 460. Optionally, size-reduction techniques such as compression and differencing may be used to reduce the size of the bundles to be sent from the server 440 to the client proxy 460. Such size-reduction techniques are well known in the art, and may be applied to the individual files in the bundle or to the bundle as a whole.

According to the preferred embodiment of the present invention, when the client proxy 460 receives the bundle returned at 407, it "unbundles" the contents, separating the individual files and storing them locally 480 (e.g. in a cache of Web pages or on a disk accessible by the workstation 470). Alternatively, the bundles may be stored locally in other ways. For example, it the files may not be separated, instead being stored intact to reduce storage space. In that situation, an index mapping each page URL to the bundle file that contains the corresponding content will be used to retrieve a page on demand from the appropriate bundle file. (The details of the unbundling process are discussed in more detail with reference to FIG. 7 below.)

After the bundle has been stored locally, the Web page originally requested at 401 will be returned 408 and displayed in the browser 450. The user may then begin interacting with the page, with the client proxy 460 enabling this interaction to occur in the same manner that it would if the user's workstation had an on-going connection to a Web server. As stated previously, a novel feature of the present invention provides that bundles may optionally contain executable code that will be downloaded and executed in the client workstation. This executable code may take the form of a Java servlet, which will be invoked by the client proxy 460 when the user begins interacting with a downloaded page. Suppose, for example, that the user requested the display of an HTML form. In the prior art, the user would complete the form, and submit it from his browser for processing by the Web server. Suppose further that the processing of this form, when submitted, includes invoking a servlet to perform some application-specific processing. When this HTML form and servlet are downloaded as part of a page bundle, the user will complete the form as before and submit it using his browser. According to the present invention, however, the client proxy 460 will intercept the completed form, and invoke the locally-stored servlet at the client side. This client-side servlet processing may create output in the form of dynamically-generated HTML content, such as a "response" page corresponding to the form the user has just processed. In the prior art, this response would have been returned to the user (from a network server) over a network connection. Using the present invention, however, the response is created locally, while still working offline, without requiring establishment of a network connection and without any of the delays and costs that accompany remote processing. Alternatively, requests may be queued for later transmission to a Web server (after establishing a network connection), allowing the user to complete forms in an offline mode in applications where an immediate response is not required and where the logic that will create the response has not been downloaded to the client workstation. Examples of the type of local processing that may be performed advantageously include: validating a request for correctness and/or completeness; generating a response dynamically; fetching a response from a local cache or local storage; and reformatting an outbound request and storing the modified version in the outbound queue for later transmission.

FIG. 4B shows the flow that occurs when a requested page has already been delivered to the workstation 470 and is available from local storage 480. The user requests 401a a Web page, and the request is intercepted by the client proxy 460. The client proxy 460 checks its cache, and finds the requested page already available. The file for this page is returned immediately 408a to the browser, without the need to access a Web server or to make a network connection.

FIG. 5 depicts an example of the syntax that may be used for the bundle descriptors that are used to describe the contents of a bundle and which are subsequently processed by the bundling Web server 440 to create a bundle. Two bundle descriptors 500, 550 are illustrated. As shown at 502 and 504, and again at 552 and 554, the separators "<bundle name=". . . ">" and "</bundle>" have been used in this example to delimit the description of each bundle. The keywords "" and "" signify the beginning and end of an individual page (or file) description, respectively. (See 511 and 513, for example.) The example bundle named "bundle1" 502 comprises 3 files 510, 520, 530. The first two files are text files, encoded using HTML, as indicated by the file names at 512, 522. The third file is a binary file, encoded in "gif" format (Graphics Interchange Format), as shown by the file name at 532. Note that the terms "file" and "page" are used interchangeably in this discussion, to refer to the file in which the representation of a page (or other data used by or within a page, such as an image in "gif" format) is stored.

The second bundle descriptor 550 specified in FIG. 5 comprises 4 files 560, 570, 580, 590. Note that one of the files, "page2.htm1", is specified 520, 570 as being a member of both bundles 500, 550, so that the content of these two bundles overlaps. This will occur when a common page is used in two different interactions (represented by two different bundles). In the preferred embodiment, when the user requests a page that is specified as being in more than one bundle, the first bundle descriptor that contains the page will be retrieved from the bundle repository. This second bundle descriptor 550 also specifies that the bundle includes an executable file, where a file named "compute.class" 592 contains executable code (such as a Java servlet) that will be downloaded with this bundle, and which may then be executed on the client workstation during an offline session as if the client requests had been sent to a Web server over a network connection.

Though the bundle descriptor in FIG. 5 has been shown with a particular XML representation and syntax, it is to be understood that alternative embodiments of this invention may represent bundle information using other formats without taking away from any of the novel elements of this invention.

Figure 6A:
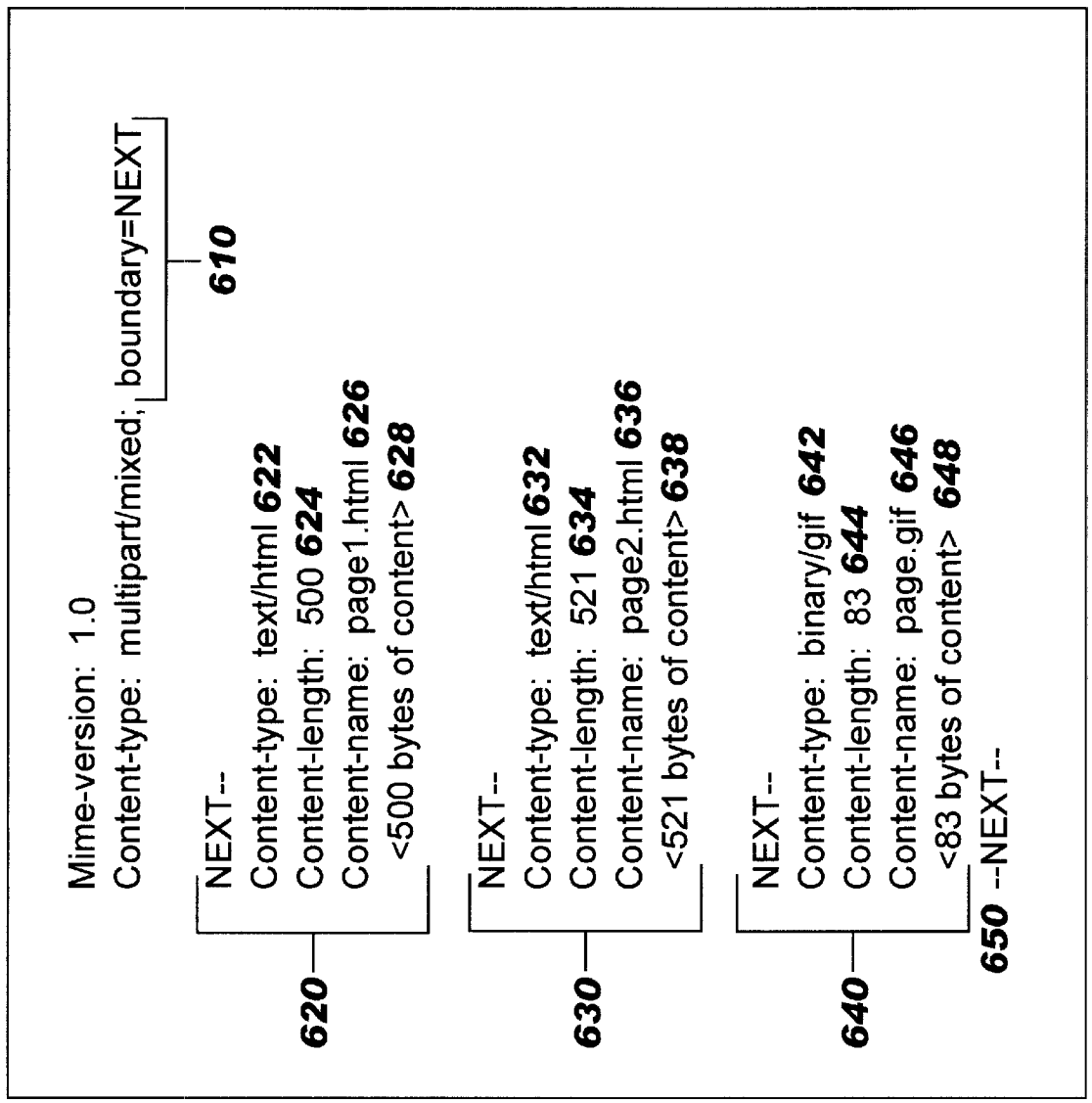

FIGS. 6A and 6B depict examples of how the contents of the bundles may be represented in the output created by the bundling Web server 440. In the preferred embodiment, MIME (Multi-purpose Internet Mail Extension) syntax will be used, as shown in the example in FIG. 6A. An alternative syntax is shown in FIG. 6B. As shown at 610, the separator "NEXT" has been defined in this example as delimiting each file in the bundle. This example bundle comprises 3 files 620, 630, 640, and corresponds to the bundle descriptor 500 from FIG. 5. As stated earlier, the first two files are text files, encoded using HTML (622, 632), and the third file is a binary file, encoded in "gif" format 642. The length of each file is specified (624, 634, 644), followed by the file name (626, 636, 646). The last item 628, 638, 648 for each file is then the actual contents of the file (not shown in FIG. 6A). The end of the bundle is indicated using a special delimiter 650.

Other formats may be used for bundle contents, such as the example shown in FIG. 6B, without deviating from the inventive concepts of the present invention. In this syntax, the file names appear as the first element for each file, followed by the file length, and then the contents of the file (similar to the approach used in FIG. 6A). For example, the first file name 660 is "page1.htm1", and its length 662 is 457 bytes. The contents of the file would appear at 664.

Note that while the examples in FIGS. 6A and 6B refer to files encoded in HTML and "gif" format, a bundle may also contain files encoded in other formats, including (but not limited to) images in JPEG format, plain text, JavaScript, etc. Note also that while the bundle formats shown in FIGS. 6A and 6B show particular representations of bundle data, it should be understood that alternative embodiments of this invention may employ other formats for packaging downloadable page bundles without deviating from the inventive concepts of the present invention.

Figure 7:
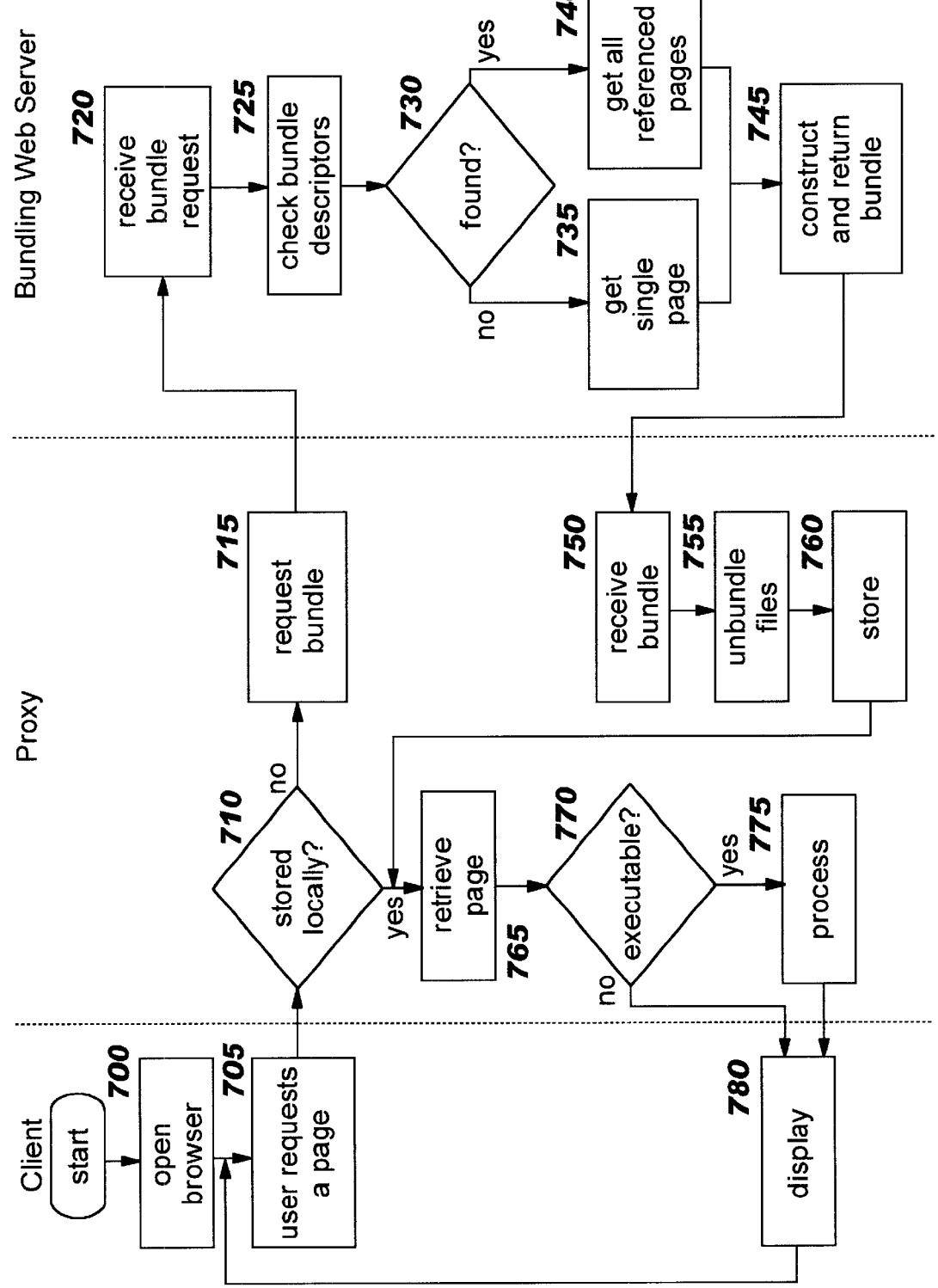
FIG. 7 depicts a flow chart which sets forth the logic involved with a preferred embodiment of the present invention to process a user's request for a Web page.

FIG. 7 depicts a flow chart which sets forth the logic involved with a preferred embodiment of the present invention to process a user's request for a Web page. This flow chart is organized into three sections, showing the logic that occurs (1) at the client browser, (2) in the client proxy 460, and (3) at the bundling Web server 440.

The process begins when the user opens a browser 700. As stated previously, this is preferably a standard browser that supports HTML, XML, or pages represented in other standard formats such as WML. At 705, the user requests a certain page. This request is sent from the browser and intercepted by client proxy 460, as represented by the transition from the first column of FIG. 7 to the second column. At 710, the proxy determines whether a local copy of this requested page is available. If it is, then the page is retrieved 765 and processing continues at 770 as described below. If the page is not available, then a request for the page (or for the bundle containing the page) is sent from the client proxy to the bundling Web server at 715. This request is received by the bundling Web server at 720, as shown by the transition from the second column of FIG. 7 to the third column. At 725, the bundling Web server inspects the bundle descriptors, to see if a descriptor containing the requested page (or having the requested bundle name) is available. The result of this inspecting is tested at 730. If no descriptor is found, then the single page named in the request is retrieved at 735, and a bundle is constructed and returned for this page at 745. Otherwise, when a matching descriptor is found, then it is used by the bundling Web server at 740 to retrieve all referenced pages and files. A bundle is constructed from these pages and files, and returned to the client proxy at 745. When file size reduction is being performed, the reduction process (not shown in FIG. 7) may be applied to the individual files of the bundle or to the bundle as a whole at 745. The client proxy receives the bundle from the bundling Web server at 750. When the files from the bundle are being separately stored at the local machine, the files are unbundled 755 and stored 760. This unbundling and storing process is described by the following pseudocode:

while not the end of the bundle {
    read and store the current filename
    read the number of bytes in that file
    read this number of bytes, and store using the corresponding filename }

(Refer to FIGS. 6A and 6B for examples of the format in which the bundle may be represented prior to unbundling.) When the files of the bundle are being stored in a different manner, the appropriate steps for the particular storage technique are performed in place of 755. (For example, when the bundles are being stored intact, the index that maps the page URLs to the bundles may be made available to the client proxy by creating and/or storing the index at 755.) After the storing 760 completes, control transfers to 765 to retrieve the page the user originally requested.

Control reaches 770 after the requested page is retrieved at 765. At 770, a test is made to see if this page reference is an invocation of executable code. If so, the downloaded executable logic is processed at 775 and control then transfers to 780. If the request did not require execution, the test at 770 has a negative response and control transfers directly to 780. At 780, a page is displayed to the user on the browser. Following display of the page at 780, control returns to 705 to await the user's next request for a page. This process repeats until the user chooses to quit using the browser (which has not been shown in FIG. 7).

In an optional aspect of the preferred embodiment, a transcoding filter process may be used to reduce the size of bundles being delivered to the workstation 470. Such a filtering process is described in U.S. Pat. No. 6,138,156, titled "Selecting and Applying Content-Reducing Filters Based on Dynamic Environmental Factors," which is assigned to the same assignee and is incorporated herein by reference. This transcoding process accounts for dynamic factors such as the current memory or storage capacity of the user's workstation. For example, if the user's workstation does not currently have sufficient space to store a color graphics file or an embedded sound file, an algorithmic reduction process may be applied to any color images to reduce them to grayscale, and any sound files referenced from a Web page may simply be omitted. In this manner, the size of individual files from a bundle can be greatly reduced. When a transcoding process is used, it may be performed as part of the bundle generation process at 745 in FIG. 7. Prior to including each file in the bundle, the list of available transforms can be consulted (as described in the referenced patent), and any applicable transform can be applied. Alternatively, the file transformation can be performed after each file is retrieved at 740, as will be obvious to one of ordinary skill in the art.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. A method of enabling offline Web page processing, comprising steps of:

receiving a request for a selected Web page;

retrieving one or more files which are determined to be related to the selected Web page;

retrieving a file containing the selected Web page;

packaging the retrieved files together as a transmission unit; and returning the packaged transmission unit as a response to the request.

2. The method according to claim 1, wherein the request is received from a client-side proxy and the response is returned to the client-side proxy.

3. The method according to claim 1, wherein the returned packaged transmission unit can be used by a client-side proxy to serve requests for the selected Web page without having a connection to a network.

4. The method according to claim 3, wherein the returned packaged transmission unit can be used to serve at least one of the related pages without having a connection to a network.

5. The method according to claim 3, wherein the returned packaged transmission unit can be used to serve at least one of the related pages, responsive to navigation from the selected Web page, without having a connection to a network.

6. The method according to claim 1, wherein the determination of the related files is performed responsive to receiving the request.

7. The method according to claim 1, wherein the determination of the related files is performed in advance of receiving the request.

8. The method according to claim 7, further comprising the step of updating the advance determination, responsive to receiving the request, to account for any changes in the files which are determined to be currently related to the selected Web page.

9. The method according to claim 1, wherein the determined related files are identified in a descriptor stored in a repository, and wherein the retrieving one or more files step consults the stored descriptor to retrieve the identified files.

10. The method according to claim 9, wherein the related files in the descriptor are determined manually.

11. The method according to claim 9, wherein the related files in the descriptor are determined programmatically.

12. The method according to claim 11, wherein the programmatic determination is performed by a data mining operation.

13. The method according to claim 11, wherein the programmatic determination is performed by a web crawler operation.

14. The method according to claim 11, wherein the determination of the related files is performed by recursively locating references to the related files, the references being embedded in the file containing the selected Web page and its related files.

15. The method according to claim 14, further comprising the step of halting the recursively locating step when a total size of the related files and the file containing the selected Web page exceeds a determined value.

16. The method according to claim 11, wherein the programmatic determination is performed responsive to receiving the request.

17. The method according to claim 11, wherein the programmatic determination is performed periodically.

18. The method according to claim 17, 4further comprising the step of revising the programmatic determination upon receiving the request.

19. The method according to claim 1, further comprising the step of applying a content reducing transformation to one or more of the retrieved files prior to operation of the packaging step.

20. The method according to claim 1, further comprising the step of applying a content reducing transformation to the packaged transmission unit prior to operation of the returning step.

21. The method according to claim 1, wherein one or more of the related files comprises executable code.

22. A system for enabling offline Web page processing, comprising:

means for receiving, from a client-side proxy, a request for a selected Web page;

means for retrieving one or more files which are determined to be related to the selected Web page;

means for retrieving a file containing the selected Web page;

means for packaging the retrieved files together as a transmission unit; and means for returning the packaged transmission unit as a response to the request, wherein the returned packaged transmission unit can be used by the client-side proxy to serve requests for the selected Web page without having a connection to a network.

23. The system according to claim 22, wherein the determination of the related files is performed responsive to receiving the request.

24. The system according to claim 22, wherein the determination of the related files is performed in advance of receiving the request and is updated, responsive to receiving the request, to account for any changes in the files which are determined to be currently related to the selected Web page.

25. The system according to claim 22, wherein the determined related files are identified in a descriptor stored in a repository, and wherein the means for retrieving one or more files consults the stored descriptor to retrieve the identified files.

26. The system according to claim 25, wherein the related files in the descriptor are determined manually.

27. The system according to claim 25, wherein the related files in the descriptor are determined programmatically.

28. The system according to claim 27, wherein the programmatic determination is performed by a data mining operation.

29. The system according to claim 27, wherein the determination of the related files is performed by recursively locating references to the related files, the references being embedded in the file containing the selected Web page and its related files.

30. The system according to claim 29, further comprising means for halting the recursively locating step when a total size of the related files and the file containing the selected Web page exceeds a determined value.

31. The system according to claim 27, wherein the programmatic determination is performed responsive to receiving the request.

32. The system according to claim 22, further comprising means for applying a content reducing transformation to one or more of the retrieved files prior to operation of the packaging step.

33. The system according to claim 22, wherein one or more of the related files comprises executable code.

34. The system according to claim 22, wherein the returned packaged transmission unit can be used to serve at least one of the related pages without having a connection to a network.

35. In a computing environment capable of having a connection to a network, computer readable code for enabling offline Web page processing, the computer readable code being readable by a computer system in said environment and comprising:

a subprocess for receiving, from a client-side proxy, a request for a selected Web page;

a subprocess for retrieving one or more files which are determined to be related to the selected Web page;

a subprocess for retrieving a file containing the selected Web page;

a subprocess for packaging the retrieved files together as a transmission unit; and a subprocess for returning the packaged transmission unit to the client-side proxy as a response to the request, wherein the returned packaged transmission unit can be used by the client-side proxy to serve requests for the selected Web page without having a connection to a network.

36. The computer readable code according to claim 35, wherein the determination of the related files is performed responsive to receiving the request.

37. The computer readable code according to claim 35, wherein the determination of the related files is performed in advance of receiving the request.

38. The computer readable code according to claim 35, wherein the determined related files are identified in a descriptor stored in a repository, and wherein the subprocess for retrieving one or more files consults the stored descriptor to retrieve the identified files.

39. The computer readable code according to claim 38, wherein the related files in the descriptor are determined manually.

40. The computer readable code according to claim 38, wherein the related files in the descriptor are determined programmatically.

41. The computer readable code according to claim 40, wherein the programmatic determination is performed by a data mining operation.

42. The computer readable code according to claim 40, wherein the programmatic determination is performed by a web crawler operation.

43. The computer readable code according to claim 40, wherein the determination of the related files is performed by recursively locating references to the related files, the references being embedded in the file containing the selected Web page and its related files.

44. The computer readable code according to claim 40, wherein the programmatic determination is performed periodically.

45. The computer readable code according to claim 35, further comprising a subprocess for applying a content-reducing transformation to the packaged transmission unit prior to operation of the returning step.

46. The computer readable code according to claim 35, wherein one or more of the related files comprises executable code.

47. The computer readable code according to claim 35, wherein the returned packaged transmission unit can be used to serve at least one of the related pages, responsive to navigation from the selected Web page, without having a connection to a network.

* * * * *